March 21, 1939.  G. A. BOUVIER ET AL  2,151,078
ENGRAVING MACHINE
Filed June 27, 1936   3 Sheets-Sheet 1

FIG. 1

INVENTORS
G. A. BOUVIER
E. J. CRANE
BY H. Q. Whitehorn
ATTORNEY

March 21, 1939.  G. A. BOUVIER ET AL  2,151,078
ENGRAVING MACHINE
Filed June 27, 1936   3 Sheets—Sheet 2

INVENTORS
G. A. BOUVIER
E. J. CRANE
BY H. A. Whitehorn
ATTORNEY

March 21, 1939.  G. A. BOUVIER ET AL  2,151,078
ENGRAVING MACHINE
Filed June 27, 1936    3 Sheets-Sheet 3

INVENTORS
G. A. BOUVIER
E. J. CRANE
BY H. G. Whitehorn
ATTORNEY

Patented Mar. 21, 1939

2,151,078

UNITED STATES PATENT OFFICE 2,151,078

ENGRAVING MACHINE

George A. Bouvier, Minneapolis, Minn., and Edward J. Crane, Oak Park, Ill., assignors to Western Electric Company, Incorporated, New York, N. Y., a corporation of New York Application June 27, 1936, Serial No. 87,690

13 Claims. (Cl. 90—13)

This invention relates to engraving machines, and more particularly to a machine for cutting a continuous groove around the periphery of irregularly shaped plastic molded articles at the molding die parting line, which follows a variable path in a plurality of planes, to remove the overflow material occurring thereat.

In Zelenka Patent 1,904,845, granted April 18, 1933, the difficulties encountered in making a molded article of phenol plastic or similar plastic material in such a way as to provide a finished ornamental appearance at the flash line caused by the molding dies are described. One method of overcoming the difficulties is disclosed in said patent. Another method has been proposed, which comprises cutting a groove, preferably V-shaped in cross-section, along the flash line of the article for removing the flash or fin without marring the adjacent surfaces. Since the groove is narrow the unpolished surfaces within the groove do not detract from the ornamental appearance of the article which is produced by the polished surfaces of the mold.

An object of the present invention is to provide a practicable and efficient automatic machine for finishing irregularly shaped plastic molded articles wherein the flash or overflow material is removed by engraving a continuous groove of substantially constant width and depth therearound and without marring the autogenous finish of the adjacent surfaces.

In accordance with one embodiment of the invention, a machine is provided which includes means for intermittently revolving and longitudinally moving a molded telephone handset handle in a single horizontal plane past a continuously rotating high speed end milling cutter. The cutter is movable vertically to follow the flash line, in and out to follow the surface of the article, and pivotally to maintain the angle of incidence with the material at a desired value preferably 90°. A V-shaped groove is made in preference to a groove with parallel sides since it does not leave sharp corners which are apt to chip off. With a V-shaped groove, however, it is important that the depth of cut be controlled within close limits in order to prevent undesirable variations in the width of the groove at the surface. By means of cams the cutter during the movement of the handle therepast is continuously engaged with the handle and predeterminedly moved in accordance with the variable path of the overflow material to cut a groove therealong. Means is preferably provided for reducing the speed of movement of the handle at points where the path of the cutter has a substantial angle transverse to the plane of motion of the handle. Mechanism is preferably provided for slightly moving the cutter in addition to its main movements in order to average for small irregularities in the physical shape of the handle from that desired, and also to compensate for differences in contour in a vertical plane around the periphery of the handle, whereby a groove of substantially constant width and depth is obtained.

Other features and advantages of this invention will more fully appear from the following detailed description, taken in connection with the accompanying drawings, in which.

*Drive for article and cutter*

Figure 1:
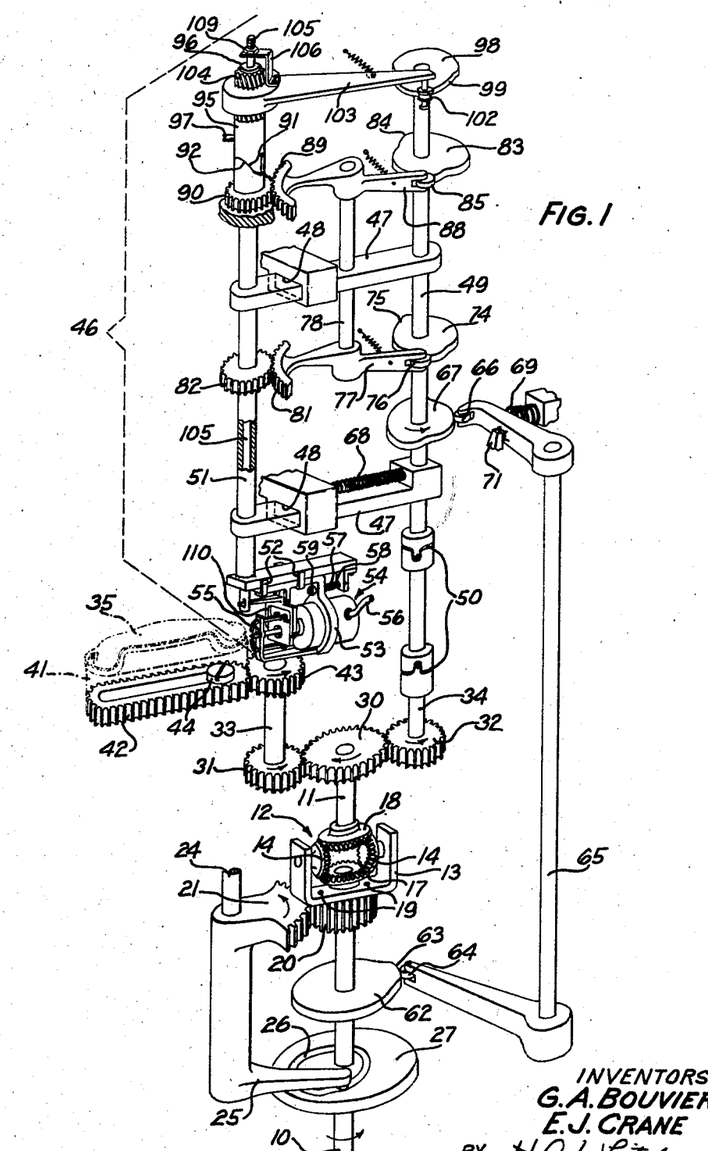
Fig. 1 is a schematic illustration of an engraving machine embodying the features of the invention as applied to the removal of the overflow material occurring on plastic molded telephone handset handles. For the sake of clearness, the frame work and most of the bearings have been omitted from the drawings.

Referring now to the drawings, particularly Fig. 1, a vertical main driving shaft of an engraving machine embodying the features of this invention is fragmentarily indicated at 10. In line with and above the driving shaft 10 is a driven shaft 11. Interposed between the driving and driven shafts is a differential gear train 12 operatively connected to the adjacent ends of the shafts 10 and 11, the shaft 10 being driven during the operation of the machine at a predetermined constant speed from a suitable power source (not shown) in the direction of the arrow thereon. The gear train 12 comprises a carrier 13 rotatably supporting at diametrically opposite points bevel pinions 14 which are constantly in mesh with bevel gears 17 and 18 fixed for rotation with the shafts 10 and 11, respectively. Secured to the under side of the carrier 13, as indicated at 19, is a gear 20 which, together with the carrier, is mounted so that they may rotate about the driving shaft 10 independently of the rotation of the latter. A gear segment 21 pivotally supported on a stud shaft 24 meshes with the gear 20. Integral with the segment 21 is an arm 25 carrying a cam follower which constantly rides in a cam groove 26 formed in a cam disk 27 fixed to rotate with the driving shaft 10.

At its upper end the driven shaft 11 has fixed thereto a gear 30 which meshes at diametrically opposite points with similar gears 31 and 32 fixed to driven shafts 33 and 34, respectively. Assuming the driving shaft 10 is rotating in the direction of the arrow thereon, it will be apparent that if the carrier 13 is held stationary, the direction of rotation of the driven shaft 11 will be in an opposite direction as indicated by the arrow on the gear 30, through the interposed differential gear train 12. Also that the driven shafts 33 and 34 by means of the gears 30, 31 and 32 will be driven in the direction of the arrows on the gears 31 and 32, respectively. With the driving shaft 10 rotating at a definite rate of speed and the differential carrier 13 held stationary, a predetermined speed of rotation of the driving shaft 10 will be transmitted through the gear train 12 to the driven shaft 11 with the gear ratios shown and thence to the driven shafts 33 and 34. The rate of speed of the latter shafts is determined by the ratio of the gear 30 to the gears 31 and 32, which in the present embodiment is two to one, so that the rate of speed of the shafts 33 and 34 will at all times be twice that of the shaft 11.

At predetermined intervals in the operation of the machine, to be more fully described hereinafter, it is desirable that the rate of speed of the driven shafts 33 and 34, as described above, be varied. The shape of the cam groove 26 of the disk 27 rotating with the driving shaft 10 is such that at predetermined intervals during the grooving, as above described, of a telephone handset handle 35 (Figs. 8 and 9), such intervals corresponding to peripheral portions A of the handle which is moving longitudinally during the grooving of these portions, which are at an appreciable angle with respect to the plane of motion, the cam follower carried by the arm 25 of the gear segment 21 will ride onto short dwell portions of the cam groove 26 during which no angular movement of the segment will be effected and the differential carrier 13 will remain stationary, thus resulting in the driven shafts 33 and 34 being driven at twice the speed of the main driving shaft 10, or at a slightly reduced or what will be termed hereinafter "slow speed" as compared to other predetermined intervals during the grooving of the handle, such intervals corresponding to peripheral portions of the handle between the spaced portions A, which are effected at what will be termed hereinafter as "high speed". The "high speed" intervals are effected by the follower of the arm 25 riding onto other portions of the cam groove 26 displaced from the dwell portions thereof, whereby the gear segment 21 will be rotated about its pivot 24 in the direction of the arrow thereon and through the gear 20 fixed to the carrier the latter will be angularly moved together with the bevel pinions 14 as a unit about the axis of the shaft 10 and in the direction of rotation of the shaft 11, the bevel pinions 14 rotating about their own axes while traveling around the gears 17 and 18. This rotation of the differential carrier 13 controlled by the displaced cam groove portions, it is obvious, effects the desired "high speed" rotation of the driven shaft 11 and accordingly to the driven shafts 33 and 34 from the driving shaft 10 through the differential gear train 12.

The telephone handset handle 35 to be grooved (Figs. 8 and 9) is shown in Fig. 1 as mounted upon a supporting head or table 41, both shown in broken outline, the table being slidably and rotatably carried upon a suitable slideway (not shown) for movement in a single horizontal plane along a predetermined path. The handle 35 is secured to the head 41 by suitable chucking means which for the sake of simplicity has been omitted from the drawings, since it forms no part of this invention and is not considered necessary to a full understanding thereof. Fixed to the table 41 is an elongated slotted "mangle" type gear 42 which meshes with a gear 43 similar to the gear 31 and mounted on the same driven shaft 33. The gear 42 is guided during the driving thereof through the gear 43, by a headed pin 44 extending through the slot thereof and fixed to the slideway upon which the table 41 moves.

As shown in Fig. 1, the table 41 is in its normal position with the handset handle 35 ready to be grooved, the longitudinal center line of the gear 42 passing through the axis of rotation of the gear 43. At the start of an operating cycle the gear 43 will be rotated at a suitable speed, under the control of the cam groove 26, clockwise or counter to the direction of the arrow thereon, while the gear 42 and the handle 35 following the movement of the gear 43 will be rotated counterclockwise for 7°. The purpose of this initial movement counter to its direction of movement during the main grooving operation to remove the overflow material is to provide for a definite overlapping of the path of the cutter to insure continuity of the groove. Simultaneously with this movement of the handle 35 the cutter is advanced to engage the periphery thereof. Thereafter the handle is rotated clockwise at "high speed" for 97° followed by a longitudinal movement at "high speed", except for the portions A whereat the speed is changed to "slow speed", thereafter a 180° clockwise rotation at "high speed", followed by a further longitudinal movement at "high speed", except for the portions A whereat the speed is changed to "slow speed", and then a 90° clockwise rotation at "high speed" to carry the table 41 and thereby the handle 35 back to its normal position as shown in Fig. 1.

The above mentioned overlapping movement at the start of the operating cycle is produced by a rapid clockwise movement of the gear segment 21, sufficiently rapid to cause the gear 20 to rotate counter-clockwise at more than one-half the rate of the main drive shaft 10, thus causing a backward rotation of the shaft 11. No attempt has been made in the drawings to show the exact configuration of the cam groove 26, since it will be apparent from the above description how it should be cut to produce the described movements. It is within the contemplation of the invention to have the gear segment 21 stationary during the "slow speed" movements, as above described, or to have it rotating slowly clockwise during such movements, or even counter-clockwise at a slower rate than during the "high speed" movements.

*Mechanism for moving cutter longitudinally*

A mechanism, which will be termed an "upper unit" about to be described, and shown embraced within the bracket 46 includes a frame fragmentarily illustrated by spaced horizontal connecting and bearing bars 47 which, together with all the elements carried thereon, are mounted as a unit upon suitable slideways 48 for reciprocatory movements in a horizontal plane along lines parallel to the normal or average position of the axis of the cutting tool. Journaled in the right ends of the bars 47 is a driven cam carrying shaft 49 receiving its motion from the driven shaft 34 by a universal joint connection 50, the latter, it will be obvious, permitting the "upper unit" to be reciprocated in a horizontal plane, as mentioned above, during the continued rotation of the shaft 49. Journaled in the left ends of the bars 47 for vertical and rotary movement is a sleeve shaft 51 having rigidly attached at its lower end a horizontally extending plate between the lower surface of which and guide brackets 52 carried thereby is slidably carried an L-shaped bracket 53. Carried by a depending vertical arm of the bracket 53 is an air driven turbine motor unit 54 which constantly drives an end milling cutter 55 in the operation of the machine. The motor unit 54 is connected to a compressed air supply source (not shown) by a flexible connection 56.

A compression spring 57 surrounding a pin 58 and abutting at opposite ends the vertical arm of the bracket 53 and a bracket fixed to and depending from the plate attached to the sleeve shaft 51 normally acts to slide the bracket 53 and the elements carried thereby forward. The pin 58 has a sliding fit in the vertical arm of the bracket 53 and at its forward end is provided with a head 59 which acts as a stop member to limit the forward movement of the slidable bracket 53. The purpose of yieldably slidably mounting the motor unit 54 upon the reciprocably mounted "upper unit" will be described hereinafter.

Figure 8:
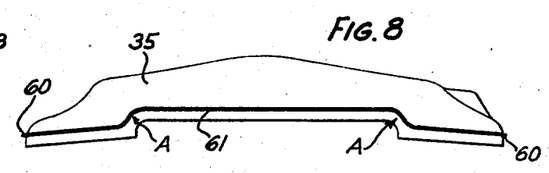
Figs. 8 and 9 are side and plan views, respectively, of a telephone handset handle as it comes from the molding dies showing the continuous overflow material which this machine is adapted to automatically remove by engraving a V-shaped groove therealong partly removed, and a groove being shown where the overflow material has been removed.
Figure 9:
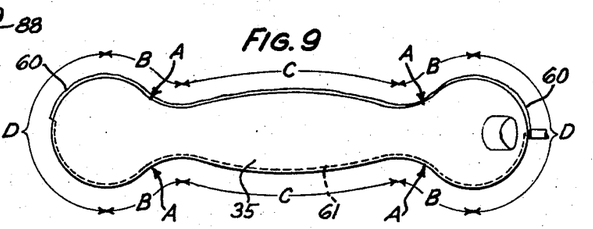

At the termination of a grooving operation, during which an endless molding flash or fin 60, shown partly removed in Figs. 8 and 9, is cut from the handle 35, and a V-shaped groove 61, shown in broken lines in Fig. 9, is cut in the handle, the "upper unit" is slid slightly to the right to the position shown in Fig. 1 so that the rotating cutter 55 carried thereon will not be engaged with the handle 35 during the removal and/or reloading operation and thereafter the unit is moved forward a similar distance to engage the cutter with the handle to be grooved. Further, it is necessary during the intermittent longitudinal movement of the handle 35 past the cutter 55, during which the peripheral portions B and C (Fig. 9) are grooved and during which grooving the handle has been rotated 90° from its position during the removal and/or reloading operations, that the cutter be moved alternately inwardly and outwardly relative to the longitudinal axis of the handle in order to maintain the cutter in predetermined operative engagement with the peripheral surface of the handle which is of varying contour, so that a substantially uniform width and depth of cut will be formed therealong in accordance with its physical shape. During the grooving of peripheral portions D of the handle 35 (Fig. 9), wherein the handle is being revolved past the cutter 55, it is not necessary to move the upper unit, but automatic means, to be described hereinafter, is provided for slightly moving the motor unit 54 and thereby the cutter 55 to average for small irregularities in the physical shape of the handle from that desired, and also to compensate for differences in curvature in a vertical plane around the periphery of the handle.

For effecting the described main reciprocatory movements of the "upper unit" the following mechanism is provided. Fixed to the main driving shaft 10 above the cam disk 27 is a cam 62 having a peripheral cam lobe 63. In the path of the lobe 63 is a cam follower 64 mounted on the outer end of an arm fixed to the lower end of an oscillatory shaft 65. At its upper end the shaft 65 carries an arm supporting a cam follower 66 which constantly rides on a peripheral cam face of a cam 67 fixed to the driven shaft 49 which rotates, as hereinbefore described, at twice the speed of the shaft 11.

A compression spring 68 is arranged to normally urge the "upper unit" to the right, as shown, the spring being permitted to act when the lobe 63 on the cam 62 rides onto the cam follower 64, which serves to rock the shaft 65 and the arm at its upper end carrying the cam follower 66 clockwise and thus overcoming the action of a compression spring 69 arranged to abut the arm carrying the cam follower 66. The spring 68, upon being permitted to act, slides the "upper unit" to the right a distance determined by the movement imparted to the follower 66 as the cam lobe 63 rides onto the follower 64. At the termination of this movement of the "upper unit", a low point of the cam 67 is riding on the follower 66. The spring 69 is appreciably stronger than the spring 68 and, therefore, when released is effective to overcome the action of the latter spring and, consequently, the "upper unit" is moved to the left. The release of the spring 69 occurs when the lobe 63 of the cam 62 has moved past the follower 64 whereupon the supporting arm for the follower 66 moves counter-clockwise, its movement being limited by a stop member 71. In this latter position of the supporting arm of the follower 66 and during the entire grooving operation, the follower 64 will be held slightly spaced from the periphery of the cam 62. The reciprocatory movements of the "upper unit", so far described, occur only at the completion of cutting the groove 61 in the handle 35, and after the loading on the table 41 of another handle to be grooved, during which interval the table, as well as the driven shafts 33, 34 and 49 are idle or stationary, and in the position shown in Fig. 1 with the longitudinal axis of the handle extending parallel to that of the rotating cutter 55. The table 41 and the shafts 33, 34 and 49 are held stationary during this interval by a suitable movement of the differential carrier 13 about the axis of the main driving shaft 10 effected by the cam groove 26 of the rotating cam disk 27 actuating the follower carried by the arm 25 of the gear segment 21, in a direction opposite to that indicated by the arrow on the gear segment.

The desired reciprocatory movements of the upper unit during the grooving of the portions B and C of the handle 35, wherein the cutter 55 is alternately moved inwardly and outwardly relative to the longitudinal axis of the handle in accordance with the physical shape or varying contour thereof, are effected by the rotating cam 67, which constantly engages the follower 66. The cam 67 is provided with two substantially identical cam face portions one at each side of the low point thereof, and since this cam makes two revolutions to one of the shaft 11 during which the handle is completely grooved, it will be apparent that each half of the cam 67 will effect similar desired movements to the cutter 55 along the portions B and C of each half of the handle. During the rotation of the cam 67 past the follower 66 the "upper unit" is reciprocated upon its slideways 48 due to the cooperating action of the compression springs 68 and 69 operatively associated with the "upper unit" and the arm supporting the follower 66, respectively.

Mechanism for angularly adjusting cutter

In order to maintain the cutter 55 at right angles to the surface of the handle 35 during the grooving thereof along the portions B and C while the handle is moving longitudinally, which is desirable in order to produce a substantially uniform groove 61 around the entire periphery of the handle, means is provided for turning the cutter 55 and the motor unit 54 as a unit about the axis of the sleeve shaft 51 in accordance with the varying contour of the handle so that the cutter will constantly be positioned at right angles to the surface being grooved.

The turning of the cutter 55, as above described, is controlled by a cam 74 which is fixed to the driven shaft 49, the cam being formed with a peripheral cam face 75. Constantly riding on the cam face 75 is a follower 76 mounted on one end of a spring pulled lever 77 pivoted on the lower end of a stud shaft 78 fixed to the upper bearing bar 47. The opposite end of the lever 77 has formed thereon a gear segment 81 which meshes with a gear 82 fixed to the sleeve shaft 51. The cam 74, which makes two revolutions to one of the shaft 11, is rotated in timed relation with the rotary and longitudinal movements of the handle 35 and the cam face 75 is of such contour, being formed with two substantially identical cam face portions, that during the periods when the handle is moving longitudinally the motion imparted to the follower 76 riding on the cam face will be transmitted by means of the lever 77, gear segment 81 and gear 82 to the sleeve shaft 51, which will receive the necessary oscillatory movements for turning the bracket 53 and cutter 55 to maintain the cutter at right angles to the surface being grooved.

Mechanism for vertically adjusting cutter

Since the handle 35, during the grooving operation, is moved in a single horizontal plane and the overflow material 60 to be removed therefrom constitutes a path in which the portions B and D vary substantially from the portions C, as clearly shown in Fig. 8, it is necessary that the cutter 55 be intermittently elevated and lowered in order that it may follow the variable path of the overflow material on the handle as it moves therepast.

For controlling the elevating and lowering of the cutter 55, as above described, a cam 83 is fixed to the driven shaft 49, which makes two revolutions to one of the main driving shaft 11, the cam having a peripheral cam face 84 which is constantly engaged by a follower 85 mounted on one end of a spring pulled lever 88 pivoted on the upper end of the stud shaft 78. The opposite end of the lever 88 has formed thereon a gear segment 89 which meshes with a gear 90 freely surrounding the sleeve shaft 51 and suitably supported in a fixed horizontal plane. Fixed to and extending upwardly from the gear 90 is a sleeve having an annular cam face 91 abutting a similar cam face 92 on a sleeve 95 freely surrounding the shaft 51. At its upper end the sleeve shaft 51 is provided with a flange 96 which normally rests on an upper end face of the sleeve 95 so that in an upward movement of the sleeve the shaft will also move therewith, the sleeve at all times being fixed from rotary motion by a stationary pin 97 slidably engaged in an elongated slot in the periphery of the sleeve. The cam face 84 of the rotating cam 83 is of such contour, being formed with two substantially identical cam face portions, and the cam is so timed that during the periods when the handle 35 is being grooved along the portions B and D (Fig. 9) the motion imparted to the follower 85 riding on the cam face will be transmitted by means of the lever 88, gear segment 89, to the gear 90. Thus an intermittent rotary motion in alternate directions at suitable rates of speed is imparted to the gear 90 and through the cooperating annular cam faces 91 and 92 upon the gear 90 and sleeve 95, respectively, the shaft 51, which is engaged by means of the flange 96 thereof with the upper end of the sleeve, is raised and lowered to cause suitable movements of the cutter 55 in an up and down direction to follow the path of the overflow material. The peripheral face of the gear 82 on the shaft 51 is of such width that it remains in operative engagement with the gear segment 81 during the raising and lowering of the shaft to position the cutter 55, as just described.

Means for averaging and compensating the movement of cutter to cut a groove of substantially uniform width and depth In addition to the main reciprocatory movements imparted to the motor unit 54 and thereby the cutter 55 during similar movements of the "upper unit" effected by the cam 67 and the cooperating mechanism, described hereinbefore, so that the cutter will be maintained in predetermined operative engagement with the peripheral surface of the handle 35 in accordance with an average or tolerable physical shape and thereby cut a groove 61 of substantially uniform width and depth therein while removing the molding flash 60 therefrom, other means are provided for automatically effecting slight additional similar movements to the cutter 55 independent of the movements effected by the cam 67 to average for slight variations from the desired physical shape of the handle.

These slight variations in the shape of the handles 35 are due to various causes, such as small differences in degrees of shrinkage or warpage, while cooling, after coming from the molding dies, or slight variations in the dimensions of different sets of dies, where more than one set of dies is used to produce the required output, and those due to the upper molding die being slightly offset from the lower molding die. The slight additional averaging movements of the cutter 55 are accomplished through the yieldable slidable mounting of the motor unit 54, hereinbefore described, and cooperating limiting or gauge means, to be presently described, which ride upon the peripheral surface of the handle closely adjacent the cutter 55. The use of the foregoing means, generally described, for effecting small movements of the cutter to take care of slight variations from the desired average physical shape of the handle 35 makes it necessary to provide additional cooperating means for giving the limiting or gauge means a predetermined compensatory movement to allow for extreme differences in contour in a vertical plane which are encountered around the periphery of the handle. Unless these slight additional averaging and compensating movements of the cutter are effected a noticeable variation in the width of the groove 61 will occur if cut along a fixed average path controlled by the cam 67 alone.

Figure 3:
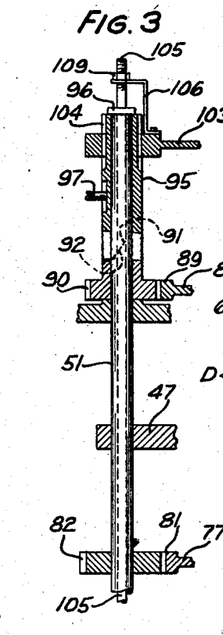
Fig. 3 is an enlarged vertical detail section of a portion of Fig. 1.

The additional horizontal reciprocatory movements of the cutter 55 upon the "upper unit" in order to cut a groove 61 of substantially uniform width and depth in the handles, as above described, are controlled by the following mechanism: Fixed to the driven shaft 49 is a cam 98 having a peripheral cam face 99 formed with two substantially identical cam face portions to correspond with identical operations effected on opposite sides of the handle, upon which constantly rides a follower 102 mounted on one end of a spring pulled lever 103, the opposite end of the lever having internal helical gear teeth (Fig. 3) engaged with similar teeth 104 formed on the upper end of the non-rotary sleeve 95. The follower 102 is slidably mounted on a pin attached to the lever 103 whereby the follower will remain in constant engagement with the cam face 99 during vertical movements of the shaft 51 controlled by the cam 83, during which movements the sleeve 95 is moved upwardly and downwardly, thereby carrying the lever 103 therewith. Extending freely through the sleeve shaft 51 is a rod 105 which at its upper end projects through an apertured bracket 106 secured to the upper face of the lever 103. A nut 109 adjustably threaded onto the projecting upper end of the rod 105 and resting on the upper face of the bracket 106 is effective normally to support the rod in a desired vertical position upon the "upper unit".

Figure 2:
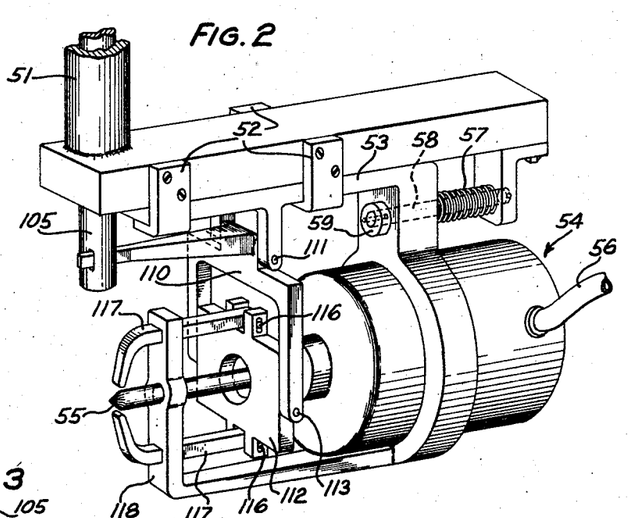
Fig. 2 is an enlarged view in perspective of a portion of Fig. 1.

The lower end of the rod 105 is operatively connected to the outer end of a horizontal arm of a bell crank lever 110 (Fig. 2) pivoted at 111 to depending ears of the horizontally slidable bracket 53 which supports the motor unit 54. The connection between the rod 105 and the arm is such that during vertical movement of the rod the lever 110 will move about its pivots, but permitting the arm to move longitudinally when the slidable bracket 53 is moved relative to the upper unit in a manner presently to be described. A vertical arm of the bell crank lever 110 is bifurcated and between the furcations thereof and surrounding the cutter 55 is an apertured plate 112 pivoted at 113 to the lower ends of the furcations. Operatively connected through pins and elongated slots, indicated at 116, to diametrically opposite points of the plate 112 and intermediate the furcations of the vertical arm of the lever 110, are limiting or gauge fingers 117 of such length and arrangement that when the cutter 55 is engaged with the periphery of the moving handle 35 the fingers ride on the peripheral surface of the handle closely adjacent each side of the path of the cutter 55. The fingers 117 near their outer ends are supported for parallel longitudinal sliding movement in an arm 118 carried by the bracket 53 of the motor unit 54, the arm also serving to support the high speed cutter 55 at its outer end from lateral deflection relative to the motor unit.

Figure 4:
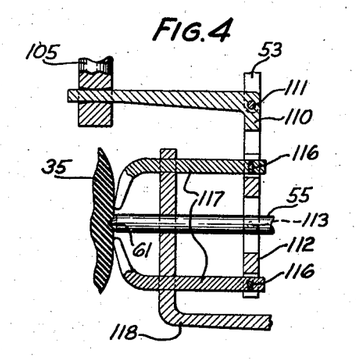
Figs. 4 to 7, inclusive, are schematic enlarged fragmentary illustrations of the averaging and compensating mechanisms in operative relation with peripheral portions of the handle.
Figure 5:
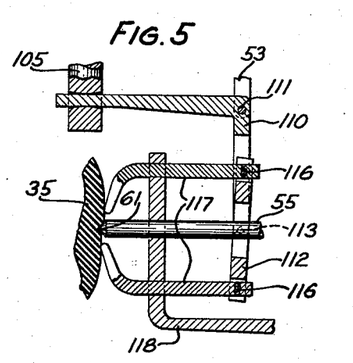
Figure 6:
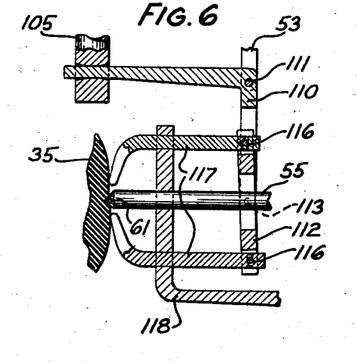

Referring particularly to schematic Figs. 4, 5 and 6, there is shown in Fig. 4 an ideal condition of the vertical peripheral surface of the handle 35 at each side of the path of the cutter 55 while it is removing the molding flash 60 (Figs. 8 and 9), the handle being shown fragmentarily. The limiting fingers 117 are riding on the periphery of the handle under the action of the yieldable slidable mounting (Fig. 2) of the motor unit 54, and since there is no irregularity in the physical shape of the handle from an average or tolerable shape, due to uneven shrinkage or warpage, the fingers are alined vertically and the cutter 55 is cutting a symmetrical groove 61 of the desired dimensions. It will be apparent that within the range of movement of the motor unit 54, permitted by its yieldable slidable mounting, small differences in dimensions of the handle from the tolerable average, with the surface of the handle at each side of the path of the cutter 55 being in vertical alinement, as shown in Fig. 4, will merely result in the movement of the fingers 117 into limiting engagement with the handle, the movement thereof varying with differences in dimensions of the handle and a symmetrical groove 61 of the desired dimensions will be cut.

In Figs. 5 and 6 conditions of the surface of the handle 35 at each side of the path of the cutter 55 when the upper molding dies are slightly offset from the lower molding dies are illustrated.

It will be noted in Figs. 5 and 6 that the limiting fingers 117 in the movement of the motor unit 54 to carry the cutter 55 into cutting engagement with the periphery of the handle 35 have engaged the handle and automatically adjusted themselves by a parallel limiting movement in opposite directions, for each condition of the offset on the handle, upon the supporting member 118, and consequently the plate 112, to which the inner end of the fingers are connected by the pin and elongated slot connections 116, has been rocked about its pivots 113 in opposite directions, and without disturbing the position of the bell crank lever 110. These limiting movements of the fingers 117 serve to average the errors in the peripheral surface of the handle caused by the upper and lower offsets of the molding dies and thus the cutter 55 is so positioned that the amount it cuts deeper on one side of the groove is exactly equal to the amount it cuts shallower on the other side thereof. This results in the forming of a groove of maximum general uniformity consistant with the described offset conditions, the width of the groove 61 remaining substantially constant.

Figure 7:
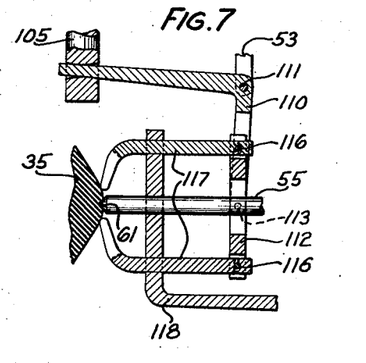

In schematic Figs. 4 and 7 there are shown extreme differences in contour in a vertical plane which are encountered around the periphery of the handle, which is shown fragmentarily. Fig. 4 represents a minimum difference along the peripheral portions D, while Fig. 7 represents a maximum condition along the portions C (Fig. 9). It is obvious that to cut substantially the same depth of groove under each of the conditions represented by Figs. 4 and 7, the limiting fingers 117 must be farther back of the point of the cutter 55 in the condition disclosed in Fig. 4 than that of Fig. 7. That is, the position of the fingers 117 as a whole must be capable of being given a movement with respect to the motor unit 54 and the cutter 55 in a direction parallel to the axis of the cutter. Since the bell crank lever 110 is pivoted to the slidable bracket 53 at 111 and thereby at a point integral with or fixed relative to the motor unit 54 and cutter 55 it is obvious that any motion of the lever will change the position of the fingers relative to the motor unit and cutter.

It is to be understood that the independent movement of the limiting fingers 117, as described in connection with Figs. 4, 5 and 6, is not transmitted to any deleterious extent to the bell crank lever 110, due to the latter being pivoted at 113 to the plate 112 to which the fingers are connected by the pin and elongated slot connections 116. The pivoted plate 112 acts as a whiffle-tree to equalize for abnormal differences between the upper and lower halves of the molded handset.

The positive movements of the limiting fingers 117 to position the fingers relative to the motor unit 54 and cutter 55 during the cutting of the groove 61 in the handle 35 to compensate for extreme differences in vertical contour encountered around the periphery of the handle, as illustrated in Figs. 4 and 7, and described hereinbefore, are effected by the cam 98 which at predetermined intervals during its rotation causes slight rotary motion in opposite directions, to be imparted to the spring pulled lever 103 carrying the follower 102 and by means of the internal helical gear teeth of the lever engaged with the similar teeth of the non-rotary sleeve 95 surrounding the sleeve shaft 51, vertical movements are imparted to the lever and through the attached bracket 106 engaging the nut 109 on the vertically movable rod 105 the latter is moved upwardly and downwardly, thus rocking the bell crank lever 110 about its pivots 111 on the yieldable slidable bracket 53, supporting the motor unit 54 and cutter 55, the lower end of the rod 105 being connected to the horizontal arm of the lever. It will be obvious that under the control of the cam 98 the limiting fingers 117 are adjusted toward and from the point of the cutter 55 in a direction parallel to the axis of the cutter to allow for extreme differences in contour in a vertical plane occurring around the periphery of the handle 35. Thus the cutter 55 will be so limited in its movement toward the handle, at portions of its varying peripheral contour, in removing the molding flash 60 therefrom, that a groove of substantially uniform width and depth will be formed therein. Briefly, therefore, it is seen that the cutter 55 has a program controlled vertical movement, a program controlled swinging movement, two program controlled longitudinal movements, a third type of automatic longitudinal movement controlled by the article itself through the gauge fingers 117 riding thereon. The program controlled movements are, of course, predetermined substantially in accordance with the ideal desired shape and size of the molded article, while the gauge controlled movements are for taking care of variations from the ideal which occur in practice.

*Operating cycle*

It is believed, from the foregoing description of the improved automatic engraving machine disclosed as applied to the finishing of plastic molded telephone handset handles wherein the overflow material is removed by cutting a continuous groove therearound, that the manner of intermittently revolving and longitudinally moving a handle in a single horizontal plane past a continuously rotating cutter which is predeterminedly moved in a plurality of directions so that it will follow the variable path of the overflow material and cut a groove of substantially constant width and depth thereat will be clearly apparent. However, it may be well to indicate, by way of summary, what such general operation involves.

It will be assumed, for the purpose of this general description, that for each revolution of the main driving shaft 10 the handle 35 receives at the start of the cycle a partial revolution to overlap the path of the cutter 55 and then slightly more than one complete revolution during which the continuous groove 61 is cut therearound by the cutter 55, at the completion of which the handle will be in its normal removal and/or reloading position. At the same time, the cam shaft 49 and the cams 67, 74, 83 and 98 carried thereby are constantly driven at twice the speed of the shaft 11 through the gears 30 and 32, shaft 34, and universal joint 50, the speed of the shaft 11 varying between "high and low speeds" through the medium of the differential carrier 13, controlled by the cam groove 26 of the disk 27, in the manner hereinbefore described. It is to be understood that when the cam shaft 49 is being driven at either "high or low speed" the handle 35 is likewise driven by the gear train 30, 31, 43 and 42. Also, it will be assumed that the cams 26, 60, 67, 74, 83, 91, 92 and 98 have all been formed as well as adjusted relative to each other upon their respective shafts to time correctly the periodic movements to be effected thereby.

Beginning the cycle of operation with the continuously rotating cutter 55 retracted slightly from the peripheral surface of the handle 35 which has just been loaded onto the slidable and rotary table 41, as shown in Fig. 1, and which is held stationary for a predetermined interval during the removal and/or reloading operation by a movement of the differential carrier 13 under the control of the cam groove 26, of the disk 27 fixed to the constant speed main driving shaft 10, all in the manner previously described, the grooving of the handle immediately follows. In the continued rotation of the cam 62 the cutter 55 is advanced into operative engagement with the periphery of the handle 35 and simultaneously with the advancement of the cutter the table 41 starts its counter-clockwise movement to cause the handle to overlap the path of the cutter to insure continuity of the groove, and thereafter the handle is intermittently revolved clockwise and longitudinally moved at variable rates of speed past the cutter 55 which is predeterminedly moved in a plurality of directions, by the means previously described, to cause it to follow the variable path of the overflow material around the handle to remove the overflow material and cut a groove therealong which is of substantially constant width and depth. At the termination of one complete revolution of the table 41, the handle 35 is back at its normal position, as shown in Fig. 1, the table thereafter remaining stationary for a predetermined interval under the control of the cam groove 26 of the rotating disk 27, to permit the removal of the grooved handle from the table and the mounting of a handle to be grooved thereon. As the table 41 comes to a halt, the cutter 55 is retracted from the grooved periphery of the handle, and the cycle of operations is completed.

It is evident from the herein detailed description, that a very practicable and efficient automatic engraving machine is provided whereby the molding flash extending around the peripery of irregularly shaped plastic molded articles at the molding die parting line and following a variable path in a plurality of planes may be expeditiously and efficiently removed and a continuous groove of substantially constant width and depth formed therealong without marring the natural finish of the adjacent surfaces of the articles. Also, that by means of the averaging and compensating mechanisms for positioning the cutter to take care of slight variations from an average or tolerable physical shape of the article, due to the various causes hereinbefore mentioned, and to extreme differences of contour in a vertical plane which are encountered around the periphery of the article, a groove of maximum general uniformity may be formed in articles varying within limits from an average physical shape.

While the invention has been described with reference to a particular embodiment thereof for effecting the grooving of plastic molded telephone handset handles, it will be understood that it may be embodied in various forms, and is capable of other applications limited only by the scope of the appended claims.

What is claimed is:

1. In a machine for cutting a groove in the periphery of an irregularly shaped article, article holding means, a rotary cutting tool, means for moving the article in a single plane past the tool while engaged thereby to form a groove, and means for moving the tool longitudinally of its axis to cause it to follow the surface of the article, transversely of the motion of the article to follow a predetermined path around the article, and pivotally to maintain its angle of incidence with the surface of the article at a desired value simultaneously with the movement of the article past the tool to cause a continuous groove following a predetermined variable path in a plurality of planes to be formed in the periphery of the article.

2. In a machine for cutting a groove in the periphery of an irregularly shaped article, article holding means, a rotary cutting tool, means for intermittently revolving and longitudinally moving the article at variable rates of speed in a single plane past the tool while engaged thereby to form a groove, and means for moving the tool in a plurality of directions simultaneously with the movement of the article past the tool and in timed relation to its variable rates of speed to cause a continuous groove of substantially constant width and depth following a predetermined variable path in a plurality of planes to be formed in the periphery of the article.

3. In a machine for cutting a groove in the periphery of an irregularly shaped article, article holding means, a rotary cutting tool, means including a differential gear train for intermittently revolving and longitudinally moving the article at variable rates of speed at predetermined intervals in a single plane past the tool while engaged thereby to form a groove, means including a cam for controlling the action of the differential gear train, and cam controlled means for moving the tool in a plurality of directions simultaneously with the movement of the article past the tool in timed relation to its variable rates of speed to cause a continuous groove of substantially constant width and depth following a predetermined variable path in a plurality of planes to be formed in the periphery of the article.

4. In a machine for cutting a groove in the periphery of an irregularly shaped article, article holding means, a cutting tool, means for mounting the tool for yieldable engagement with the article, means for effecting relative motion between the tool and the article to form a groove, means for effecting additional predetermined relative movements in a plurality of directions between the tool and the article simultaneously with the first mentioned relative motion to cause a groove following a predetermined variable path in a plurality of planes to be formed in the article, and cooperating gauge members carried by the yieldable tool mounting means constantly engaging the surface of the article at each side of the path of the groove responsive to variations in the physical shape of the article from a desired average for adjusting the tool relative to the article independent of its main movement in order to govern the depth of the groove and cause a groove of substantially constant width and depth to be formed in the article.

5. In a machine for performing operations on a surface, a tool, means for producing relative movement between the tool and the surface to cause a traverse of the surface by the tool, and a gauge riding on the surface at one side of the tool and interconnected to the tool to control continuously the position of the tool in a direction normal to the surface.

6. In a machine for performing operations on a surface of varying contour, a tool, means to cause the tool to traverse the surface, gauge means riding on the surface at one side of the tool and interconnected thereto to control the depth of cut, and means for varying the relative position of said tool and said gauge means in accordance with variations in the contour of the surface.

7. In a machine, means for moving a tool and an article to be worked by said tool relative to each other to cause the tool to traverse the surface of the article, said means comprising a driving shaft, a driven shaft, a differential train of gears interconnecting the driving and driven shafts, and cam means driven by the driving shaft to vary the position of the intermediate gears of the differential train to vary the speed of the driven shaft.

8. In a machine for cutting a groove at the mold parting line of a molded article, a cutting tool, means for causing the tool to traverse the surface of the article, a plurality of gauge means riding on the surface of the article at opposite sides of the tool, and means interconnecting the gauge means and the tool to control the depth of cut differentially in accordance with the positions of the gauge means.

9. In a machine for cutting a groove at the mold parting line of a molded article, a cutting tool, means for causing the tool to traverse the surface of the article, gauge means riding on the surface of the article at opposite sides of the tool respectively, and a whiffle-tree connection between the gauge means and the tool to control the depth of cut differentially in accordance with the positions of the gauge means.

10. In a machine for cutting a groove in the periphery of an article, article holding means, a cutting tool, and automatic means including a control cam for causing relative movements between the article holding means and tool to maintain the article and tool in cutting relation for more than one complete revolution in one direction and for a portion of a revolution in the opposite direction to form a continuous groove having its starting and finishing points overlapping, said movements occurring during one cycle of machine operation.

11. In a machine for cutting a groove in the periphery of an article, article holding means, a cutting tool, and automatic means including a cam controlled differential gear train for causing relative movement between the article holding means and tool to maintain the article and tool in cutting relation for more than one complete revolution in one direction and for a portion of a revolution in the opposite direction to form a continuous groove having its starting and finishing points overlapping, said movements occurring during one cycle of machine operation.

12. In a machine for cutting a groove in the periphery of an article, article holding means, a grooving tool, and automatic means including a control cam for causing relative movements between the article holding means and tool in one direction to a predetermined initial grooving point from a predetermined common cyclic starting and finishing point and reversing the direction of said movement for more than one complete turn to return the article and tool relatively to said cyclic point to form a continuous groove having its initial and finishing points overlapping, said movements occurring during one cycle of machine operation.

13. In a machine for cutting a groove in the periphery of an article, article holding means, a cutting tool, and automatic means including a control cam for causing relative movements between the article holding means and tool in one direction to a predetermined initial grooving point from a predetermined common cyclic starting and finishing point and to relatively move the article and tool in a reverse direction past said cyclic and initial grooving points and return to said cyclic point to form a continuous groove having its initial and finishing points overlapping, said movements occurring during one cycle of machine operation.

GEORGE A. BOUVIER.
EDWARD J. CRANE.